United States Patent [19]

McQuade et al.

[11] Patent Number: 4,821,113
[45] Date of Patent: Apr. 11, 1989

[54] FULL COLOR, CONTINUOUS TONE LASER DIODE PHOTOGRAPHIC IMAGING APPARATUS AND METHOD USING THREE LASER DIODES AT PREDETERMINED FREQUENCIES

[75] Inventors: John M. McQuade, Woodbury; Richard L. Paidosh, St. Anthony, both of Minn.

[73] Assignee: Minnesota Mining and Manufacturing Company, St. Paul, Minn.

[21] Appl. No.: 736,252

[22] Filed: May 22, 1985

[51] Int. Cl.⁴ .................... H04N 1/23; H04N 1/46
[52] U.S. Cl. ........................... 358/75; 358/302; 346/108
[58] Field of Search ............ 358/75, 302, 298, 296; 346/108, 109, 76 L; 354/4; 355/35

[56]  References Cited
U.S. PATENT DOCUMENTS

| | | | |
|---|---|---|---|
| 3,750,189 | 7/1973 | Fleischer | 346/74 ES |
| 4,040,096 | 8/1977 | Starkweather | 358/302 |
| 4,122,462 | 10/1978 | Hirayama et al. | 354/5 |
| 4,175,851 | 11/1979 | Kitamura et al. | 355/14 R |
| 4,233,612 | 11/1980 | Hirayama et al. | 346/160 |
| 4,249,807 | 2/1981 | Webster et al. | 354/4 |
| 4,257,701 | 3/1981 | Hirayama et al. | 355/8 |
| 4,346,401 | 8/1982 | Ohara | 358/75 |
| 4,384,297 | 5/1983 | Ohara et al. | 358/298 |
| 4,416,522 | 11/1983 | Webster | 354/4 |
| 4,583,128 | 4/1986 | Anderson, Jr. et al. | 358/302 |
| 4,612,555 | 9/1986 | Hongou et al. | 358/302 |

OTHER PUBLICATIONS

"The Seybold Report", pp. 7–8 and 7–9.
"Performance Comparisons of Electrophotographic, Dry Silver, and Wet Process Recording Media Exposed with Gas Laser and Laser Diode Light Sources For Image Recording", by D. G. Herzog & L. W. Dobbins.
"The Retinex Theory of Color Vision"—Edwin H. Land.
"Color Vision and the Natural Image—Part 1"—Edwin H. Land U.S. Ser. No. 709,561 filed 3/8/85.
"Color Photographic Element"; U.S. Ser No. 644,874 filed 8/27/84.
"Continuous Tone Recording System".
"Modulated Light Source for Recording With GAAlAs-Lasers"—M. Lutz, B. Reiner, H. P. Vollmer, 1st Int'l., Congress on Advances, . . . (Jul. 22–26, 1983).
"Semiconductor Lasers Reach for Maturity: Applications in Fiber Optic Communications", D. R. Patterson, R. B. Childs—Photonics Spectra, pp. 83–87, (Apr. 1982).

Primary Examiner—James J. Groody
Assistant Examiner—Robert M. Bauer
Attorney, Agent, or Firm—Donald M. Sell; Walter N. Kirn; David W. Anderson

[57]  ABSTRACT

An apparatus and method for producing multi-color, continuous tone images on a photographic element sensitive to radiation outside the visible region of the electromagnetic spectrum includes at least two laser diodes which may be simultaneously modulated, beam combiners to combine radiation emitted by the laser diodes into a single colinear beam and a rotating polygonal mirror for scanning the combined colinear beam across the surface of the photographic element.

5 Claims, 4 Drawing Sheets

FULL COLOR, CONTINUOUS TONE LASER DIODE PHOTOGRAPHIC IMAGING APPARATUS AND METHOD USING THREE LASER DIODES AT PREDETERMINED FREQUENCIES

BACKGROUND OF THE INVENTION

1. Field of the Invention

This invention relates to an apparatus and method for providing color photographic images, and particularly such images produced from a digital or analog data base utilizing a laser radiation source.

2. Description of the Prior Art

U.S. Pat. No. 4,346,401 discloses apparatus and a method for producing a full color, continuous tone image on a color film utilizing three gaseous lasers, each laser emitting light in the visible region of the electromagnetic spectrum corresponding to one of the three primary colors. Any color of the visible portion of the electromagnetic spectrum may be obtained on the film, upon development, and continuous toning of the colors is produced by modulating the output of the gaseous lasers to vary the intensity of the light emitted by the lasers and thereby the exposure of the color film and the density of the colors produced in the film upon development.

This system is effective to produce color images but has three major drawbacks. First, a helium-neon laser, an argon laser and a helium-cadmium laser must be provided, each of which is relatively expensive, has a relatively short life and requires special care and handling. Second, an external modulator must be provided for each laser since the intensity of the light emitted by each laser cannot be directly modulated. External modulators are also expensive and multiply the cost of the system. Third, conventional color film is utilized and thus the imaging operation must be performed in visible light-proof conditions to avoid exposure of the film. Additionally, special dark rooms must be provided for the imaging operation and control over ingress and egress to the room must be maintained to prevent inadvertent admission of outside light.

U.S. Pat. No. 4,416,522 discloses apparatus and a method which eliminates the disadvantages associated with the use of conventional color film. This patent utilizes a color film which produces visible colors upon exposure to radiation in the non-visible portion of the spectrum. Thus, the resulting dye colors in the developed film belong to a spectrum (visible) different from the spectrum (non-visible) which exposes the film. With such a film, one can select exposing radiation in the various portions of the non-visible spectrum and expose the film in daylight to produce color images in the visible portion of the spectrum when the film is developed. The film is exposed by a lamp which emits a broadband beam including multiple wavelengths of non-visible radiant energy to which the emulsion layers of the film are variously sensitive. Exposure of the film to a particular wavelength or radiation is accomplished by interposing a filter between the lamp and the film which filters out all radiation except that at the desired wavelength variations in the intensity of the radiation beam produced by the lamp to vary the exposure of the film and the density of the color produced is achieved by increasing or decreasing the speed of the film relative to the exposing beam and thus changing the duration of contact between the beam and a particular portion of the film.

Two major disadvantages are associated with this system. First, changing a filter to produce individual colors is necessarily slow in itself and also slows down the process because the surface of the film must be covered three times to produce the three primary colors in the film upon development. Second, modulation of the intensity of the exposing beam by increasing or decreasing the relative speed of the beam and the film is expensive since servo motors and their associated controls must be provided for each of the x and y coordinates of the film surface.

SUMMARY OF THE INVENTION

The present invention eliminates the high inherent cost and expense of external modulation associated with gaseous lasers by providing a laser diode imaging apparatus which produces multi-color, continuous tone images on a photographic element upon exposure to laser radiation.

The photographic element includes a substrate and at least two superposed photosensitive emulsion layers on one side of the substrate, each emulsion layer being associated with a different photographic coupler capable of forming a different color dye upon exposure and development by reaction with an oxidized photographic developer, the layers being sensitized to different wavelengths of the electromagnetic spectrum. The laser diode imaging apparatus includes a plurality of laser diodes equal in number to the number of the photosensitive layers, with each of the laser diodes emitting radiation at a particular wavelength which is different from that of any of the other laser diodes and which corresponds to the wavelength at which a different one of the photosensitive layers is sensitized; means for modulating continuously the intensity of the radiation emitted by the laser diodes to correspondingly modulate the exposure of the color dye-forming photosensitive layers and thereby the density of the color upon development; means for directing the radiation emitted by the laser diodes to the photographic element, focusing the radiation to a spot and transversely scanning the radiation spot across the surface of the photographic element; and means for advancing the photographic element and the scanned radiation in a direction having a component direction perpendicular to the direction of scanning so that all portions of the photosensitive layers are exposed to the laser diode radiation and an image is produced by the exposure of the photosensitive layers to the laser diode radiation. The image produced is full colored in that the entire color space available from the various combinations of the multiple color dyes in the photographic element can be achieved by various combinations of the radiation intensities from the multiple laser diodes. The image produced is continuous tone in that the density of any color is determined by the simultaneous independent modulation of the multiple laser diodes and thereby the exposure of the photosensitive layers.

The method of producing full color, continuous tone images includes providing laser diodes corresponding in number to the number of the photosensitive layers of the photographic element, with each laser diode emitting radiation at a different wavelength and corresponding in wavelength to the wavelength at which a different photosensitive layer is sensitized; directing radiation from the laser diodes to the photographic element so that radiation from each of the laser diodes exposes each of the photosensitive layers to produce a color in each photosensitive layer upon reaction with a photographic developer; and modulating continuously the intensity of the radiation emitted by each of the laser diodes and directed to the photographic element so that the density of the color produced upon reaction with a photographic developer is correspondingly modulated in a continuous tone. The method may further include the steps of combining the radiation emitted by the laser diodes into a single beam and traversing the photographic element with the radiation emitted by the laser diodes and simultaneously moving the photographic element in a direction having a component direction perpendicular to the direction of traversal.

BRIEF DESCRIPTION OF THE DRAWINGS

The present invention will be more thoroughly described with reference to the accompanying drawings wherein like numbers refer to like parts in the several views, and wherein.

DESCRIPTION OF THE PREFERRED EMBODIMENTS

Figure 1A:
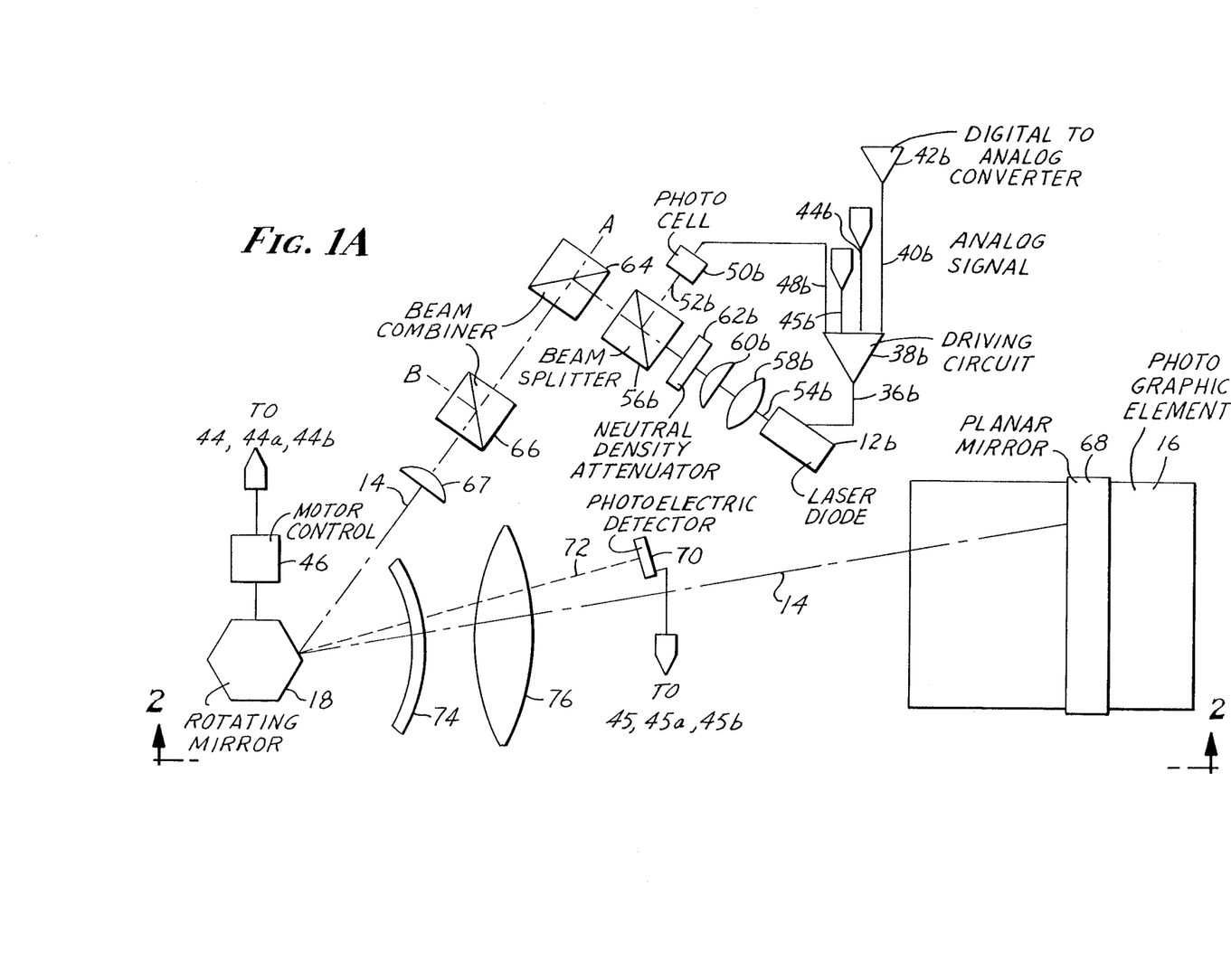
FIG. 1 is a schematic view of a laser diode imaging apparatus according to the present invention.
Figure 1B:
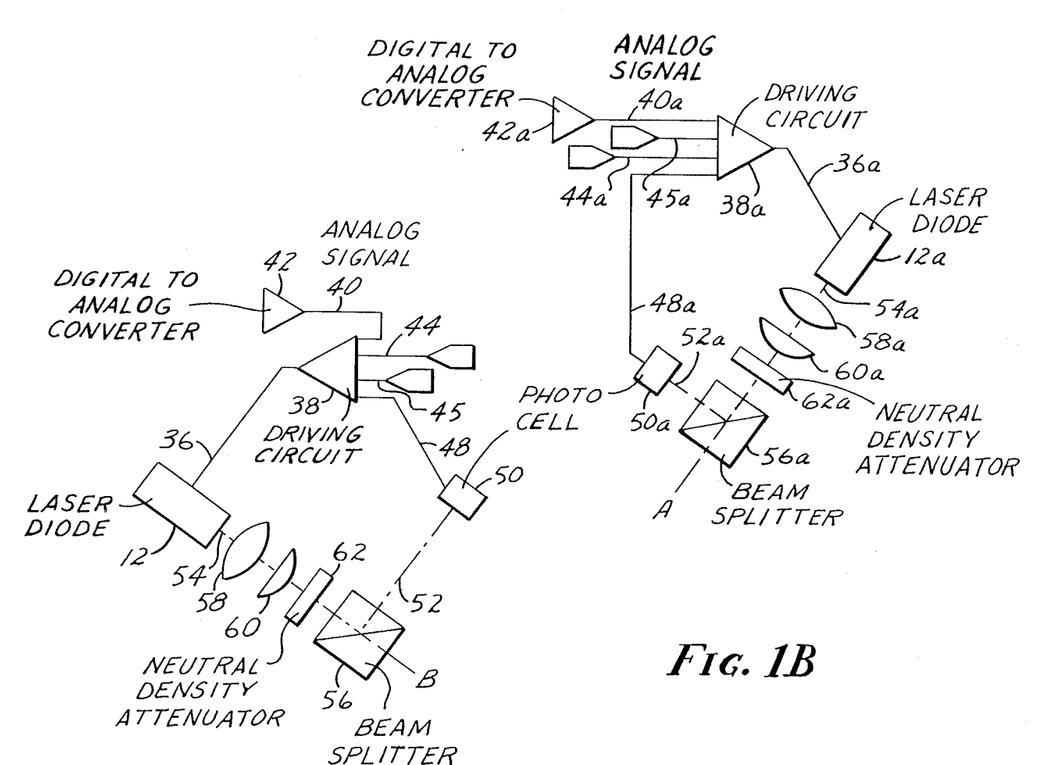

Briefly stated, and with reference to FIG. 1, the present invention includes a laser diode imaging apparatus generally indicated as 10 which includes three laser diodes 12, 12a and 12b which emit radiation in the infrared region of the electromagnetic spectrum and preferably at wavelengths of 780 nm, 830 nm and 880 nm. This infrared radiation is combined into a single beam 14 which is scanned across a photographic element receptor surface 16 by means of a rotating or oscillating single or multi-surfaced mirror 18.

In the preferred embodiment, the photographic element 16 is capable of producing a visible, full color and continuous tone image upon exposure to radiation in the infrared region in the electromagnetic spectrum, without exposure to radiation or light contained within the visible region of the electromagnetic spectrum. This is accomplished by constructing the photographic element 16 of at least three photosensitive layers which correspond in number to the number of laser diodes 12, 12a and 12b. Each photosensitive layer is capable of producing one of the additive primary colors (red, blue or green) or one of the subtractive primary colors (cyan, magenta or yellow) upon exposure to infrared radiation corresponding to the radiation emitted by one of the laser diodes 12, 12a or 12b.

A full color image is produced by superposition of the at least three photosensitive layers and, therefore, the superposition of the additive primary or subtractive primary colors produced upon exposure and development. Thus various color may be produced by the relative exposure of each of the photosensitive layers and the relative presence or absence of one or more of the additive primary or subtractive primary colors. A continuous tone image is produced by controlling the overall density of the superposed colors produced upon development, and this color density may be controlled by simultaneous independent modulation of the intensity of radiation produced by the laser diodes 12, 12a and 12b and thus modulation of the total exposure of all photosensitive layers.

The Photographic Element

Figure 3:
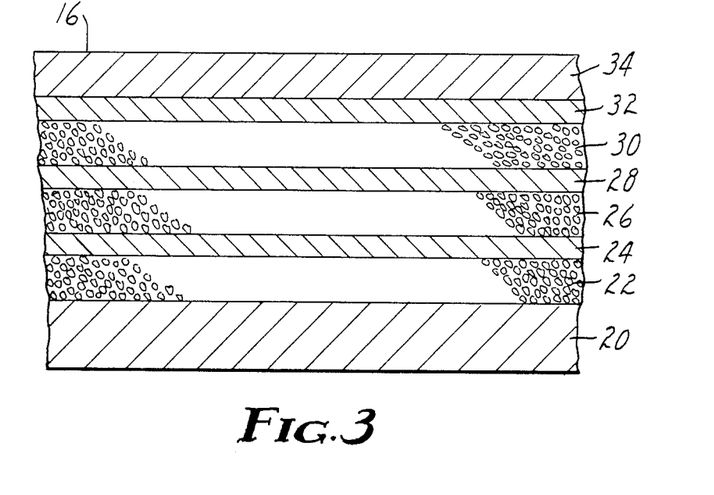
FIG. 3 is a cross-sectional view of a photographic element used in conjunction with the laser diode imaging apparatus of FIG. 1.

FIG. 3 is an enlarged, cross-sectional view of a portion of the preferred photographic element 16 which includes a support 20, which is preferably a standard resin-coated photographic grade paper but which may be a clear polyethylene terephthalate film base, a first photosensitive emulsion layer 22 sensitized to a radiation wavelength of 880 nm, a first gelatin interlayer 24, a second photosensitive emulsion layer 26 sensitized to radiation at a wavelength of 830 nm, a second gelatin interlayer 28, a third photosensitive emulsion layer 30 sensitized to radiation at a wavelength of 780 nm, a third gelatin interlayer 32 and a protective gelatin topcoat 34.

The emulsion layers 22, 26 and 30 may be any of the various types of photographic silver halide emulsions commonly used such as silver chloride, silver bromide, silver iodobromide, silver chlorobromide, silver chlorobromoiodide and mixtures thereof.

In order that each emulsion layer 22, 26 or 30 be sensitized to respond to its chosen specific wavelength of the infrared spectrum, the sensitizing dyes chosen are extremely important. A large number of dyes are known to sensitize silver halide emulsions to various portions of the infrared region of the electromagnetic spectrum. Cyanines and merocyanines are well documented as infrared sensitizers for various types of imaging systems including silver halide emulsions, with the usual dye structures being symmetrically or unsymmetrically substituted dicarbocyanines and tricarbocyanines with the auxochromic portions of the dyes being lepidine, quinoline, naphthothiazole, or benzothiazole. Heterocyclics may also be introduced to increase the rigidity and stability of the dye molecules.

In addition, each emulsion layer 22, 26 or 30 must contain a different color photographic coupler which is capable of forming a different color dye upon development by reaction with an oxidized color photographic developer. The dye-forming couplers are commonly chosen to form one of the three subtractive primary colors (yellow, magenta and cyan) in each of the three emulsion layers 22, 26 and 30. Most useful are nondiffusable, colorless couplers which may be chosen from the various classes of B-keto-carboxamides (yellow couplers), 1-aryl-5-pyrazolones (magenta couplers) and either phenols or naphthols (cyan couplers).

As stated above, the interlayers and protective topcoat layer 24, 28, 32 and 34, preferably are gelatin but other hydrophilic or hydrophobic binders may be used, providing adequate physical characteristics such as hardness and defusability are maintained. The gelatin layers 24, 28, 32 and 34 may also contain hardners, U.V. absorbers and antioxidents as is well known in the art.

The photographic element 16 thus far described would be completely adequate to the practice of the present invention if the sensitizing dyes utilized in the emulsion layers 22, 26 and 30 had essentially monochromatic absorption curves which corresponded to the monochromatic radiation emitted by the laser diodes 12, 12a and 12b. Unfortunately, while the individual sensitizing dyes contained in the emulsion layers 22, 26 and 30 may be selected to have maximum sensitivity at wavelengths corresponding to those emitted by the laser diodes 12, 12a and 12b, these sensitizing dyes have a range of absorption which may extend from a few nanometers up to a few hundred nanometers from the wavelength of maximum sensitivity. The characteristic shape of absorption curves corresponding to the sensitizing dyes listed above shows a broad tail of sensitization stretching 150 to 300 nanometers from the peak of maximum sensitization toward the shorter wavelength side of the electromagnetic spectrum and a narrower tail of sensitization extending approximately 50 to 70 nanometers wide toward the longer wavelength side of the electromagnetic spectrum. Sensitizing dyes other than the particular dyes listed are known to exhibit similar absorption curves.

State of the art laser diodes typically emit radiation between wavelengths of 750 to 950 nanometers and, as stated above, the particular laser diodes 12, 12a and 12b used in the imaging apparatus 10 have been selected to emit radiation at about 780, 830 and 880 nanometers. This separation of only 50 nanometers between the radiation emitted by successive laser diodes tends to be too narrow a range to allow for multiple layer photographic emulsions 22, 26 and 30 with totally different regions of sensitivity. Although each of the sensitizing dyes contained in one of the emulsion layers 22, 26 or 30 can be selected to correspond fairly precisely to the radiation emitted by any of the laser diodes 12, 12a or 12b, the absorption curves for the sensitizing dyes dictate sensitizing effects which could overlap into the wavelengths emitted by the remaining laser diodes. Particularly in a photographic element 16 intended to provide a full color image, this overlap of sensitivity causes poor faithfulness in color rendition because of spurious imaging of the multiple layers 22, 26 and 30 by a single wavelength of radiation.

In order to combat the formation of spurious images, the emulsion layers 22, 26 and 30 are laid down in a particular order with regard to their respective sensitivities. The emulsion layer containing sensitizing dyes sensitive to the shortest wavelength are located within the emulsion layer 30 farthest from the substrate 20 and the emulsion layer containing the dyes sensitized to the longest wavelengths are located within the emulsion layer 22 located closest to the substrate 20. Spurious images created by the exposure of emulsion layers 22, 26 or 30 by radiation intended to expose only one other layer is also prevented or reduced by increasing the difference in the speed of the emulsion layers 22, 26 or 30 sensitive to different wavelengths of the infrared, providing infrared radiation filters within the gelatin interlayers 24, 28 or 32 that absorb ranges of infrared radiation, or combining both differential speeds and filters within the single photographic element 16.

If it is required to reduce or eliminate spurious images by differential speeds between the emulsion layers 22, 26 and 30 and not rely on filtering layers, it is required that each of the three emulsion layers 22, 26 and 30 have a contrast between two and eight and differ from each other in photographic speed such that, at an optical density of 1.3, the speed of emulsion layer 30 is at least 0.2 logE units faster than the emulsion layer 26 and the speed of the emulsion layer 26 is at least 0.2 logE units faster than the emulsion layer 22.

The higher the contrast in the emulsion layers 22, 26 and 30 of the present invention, the smaller need be the differences in speed. For example, with a contrast of eight for the emulsion layers 22, 26 and 30, a speed difference of 0.2 logE units at their wavelengths of maximum sensitivity would be sufficient. Below about 4.5 in contrast, however, the difference in speed must be at least 0.4 logE units, and with a contrast between about two and four, the speed difference must be at least 0.5 logE units.

If it is desired to eliminate spurious images by the use of filter layers, without regard for the speed of the emulsion layers, it is required that a filter layer be located between emulsion layer 22 and emulsion layer 26 which absorbs infrared radiation in a range overlapping the region of maximum sensitivity of the emulsion layer 26 without absorbing more than 40% of the infrared radiation to which the emulsion layer 22 is sensitized, and that a filter layer be located between the emulsion layer 26 and the emulsion layer 30 which absorbs radiation in a range overlapping the region of maximum sensitivity of the emulsion layer 30 without absorbing more than 40% of the infrared radiation to which the emulsion layer 26 is sensitized.

Filter dyes and their methods of incorporation into photographic elements are well documented in the literature. If such dyes are used, they must be selected on the basis of their radiation filtering characteristics to ensure that they filter the appropriate wavelengths and should also be provided with non-fugitive characteristics and should be decolorizable or leachable.

These two methods of reducing or preventing spurious images may be combined in one photographic element 16 by incorporating a filtering dye between one of the pairs of adjacent emulsion layer 22 and 26 or 26 and 30 and regulating the contrast and speed between the remaining pair of adjacent emulsion layers.

Further details of the elements included in and the construction of the preferred photographic element 16, and alternative constructions, may be obtained with reference to assignee's copending U.S. patent application Ser. No. 709,561 to Simpson, filed Mar. 8, 1985.

Laser Diodes and Focusing System

Referring again to FIG. 1, there is schematically illustrated a laser diode imaging apparatus 10 which includes three laser diodes 12, 12a and 12b. Associated with each of these laser diodes 12, 12a and 12b are various elements used to regulate, focus and combine the radiation emitted by each of the laser diodes 12, 12a and 12b. Since the laser diodes 12, 12a and 12b and their associated elements operate identically, reference hereafter will be to only one of the triplicated elements for brevity and clarity of explanation. It being understood, however, that reference to and description of one element includes and describes its triplicate counterparts. For example, future reference to laser diode 12 will also include laser diode 12a and laser diode 12b.

Laser diodes 12 useful in the present invention have a power capability of at least 3 milliwatts and preferably 15 to 30 milliwatts, and a dynamic range of at least 20:1 and preferably 30:1. Radiation emitted by the diodes 12 is preferably in the infrared region of the electromagnetic spectrum between about 750 and 900 nanometers. Laser diodes 12 meeting the above criteria are commercially available from Hitachi (Tokyo, Japan), Mitshubishi (Tokyo, Japan), RCA (Lancaster, Pa.), Sharp (Osaka, Japan) and Philips (Eindhoven, Netherlands).

In order to be useful, the radiation emitted by the laser diodes 12 must be capable of being modulated between lower and higher values in order to vary the exposure of the photographic element 16, described above, and thereby the color density of the photosensitive layers 22, 26 and 30 comprising the photographic element 16. Modulation of the radiation emitted by the laser diodes 12 is accomplished by varying the forward biasing current 36 supplied to the laser diode 12 by a driving circuit 38. The driving circuit 38 is responsive to three inputs which are summed together by the driving circuit 38 and which determine the value of the forward biasing current 36 supplied to the laser diode 12.

One of the signals supplied to the driving circuit 38 is an analog signal 40 supplied directly by an analog video data source or by a digital-to-analog converter 42 such as Model No. AH8308T made by Analogic Corporation, Wickfield, Mass. The purpose of the digital-to-analog converter 42 is to convert digital data containing picture information into the analog signal 40 which may be utilized by the driving circuit 38.

Analog data may be supplied, for example, from a video camera or video display system which is appropriately synchronized with the laser diode imaging apparatus or digital data may be supplied from medical imaging systems, weather or military satellites, video cameras, optical digitizers or computer memory in Which an image is stored as a number of picture elements or pixels as is well known in the art. This digital data may also be stored in random access memory, magnetic disks, optical disks and the like.

The second input 44 to the driving circuit 38 is supplied by a motor controller 46 which is associated with the rotating or oscillating single or multi-surfaced mirror 18. Preferably, the mirror 18 is a multi-faceted polygonal mirror which rotates to scan the combined beam 14 of the laser diodes 12 across the photographic element 16. A significant problem associated with a polygonal mirror 18 is reflectivity variations between different facets of the polygon. If uncorrected, these reflectivity variations would result in change in the intensity of the combined radiation beam 14 and, consequently, a change in the exposure of the photographic element 16. To combat this problem, the motor controller 46 is provided with a facet counting capability and reflectivity information concerning the various faces of the rotating mirror 18. This information is manifested in the input signal 44 which causes the driving circuit 38 to increase or decrease the intensity of radiation emitted by the laser diode 12 depending upon the reflectivity of the particular mirror facet presented to the radiation beam 14. Of course, if only a single facet is utilized, or the variation between facets is insignificant, this second input 44 may be eliminated.

The third input 48 to the driving circuit 38 is produce by an infrared photoelectric cell 50 which is responsive to a fractional beam 52 derived from the output beam 54 of the laser diode 12. The fractional beam 52 is produced by means of a beam splitter 56 which may be a chrome-type neutral density filter such as those produced by Melles Griot of Irving, Calif. or a cube beam splitter. The infrared photoelectric cell 50 is necessary because semiconductor laser diodes 12 exhibit variations in their power output at a constant biasing current level due to the effects of temperature, aging and the phenomenon of mode hopping, which is the switching from one resonant mode to another within the lasing cavity of the laser diode 12 and which results in slightly changing wavelengths and lasing efficiencies. In order to correct for these effects and to maintain the stability of the radiation emitted by the laser diode 12, a feedback system is employed.

In this feedback system, the infrared photoelectric cell 50 continuously monitors the output of the laser diode 12 and produces the input signal 48 which adjusts the laser diode 12 to stabilize its operation. This feedback system allows virtually instantaneous changes in the output intensity of the laser diode 12 in response to the fractional beam 52 and is capable of maintaining the intensity of output beam 54 of the laser diode 12 constant regardless of long or short term changes in the radiation intensity versus biasing current characteristics of the laser diode 12.

Techniques and circuitry to accomplish this type of continuous feedback control are disclosed by M. Lutz, B. Reiner, and H. P. Vollmer in "Modulated Light Source for Recording With GaAlAs-Lasers", presented at *First International Congress on Advances in Non-Impact Printing Technology*, Venice, Italy (July 22-26, 1983) and D. R. Patterson and R. B. Childs in "Semiconductor Lasers Reach for Maturity: Applications in Fiber Optic Communications", *Phohotonics Spectra*, pages 83-87, (April 1982).

By means of the three inputs 40, 44 and 48 to the driving circuit 38 the output beam 54 of the laser diode 12 is constantly modulated, corrected for reflectivity variations of the rotating mirror 18 and corrected for variations in the operating characteristics of the laser diode 12 itself. Thus, by means of the two corrective inputs 44 and 48, very precise control of the diode 12 output is achieved.

The output beam 54 which is emitted from the laser diode 12 possesses characteristics which the optical system of the imaging apparatus 10 must accommodate. Laser diodes 12 of the type described herein produce an output beam 54 Which is divergent and, in addition, may be highly astigmatic in that the component of the beam parallel to the semiconductor junction appears to originate from a source at a different location along the cavity than the component of the beam 54 perpendicular to the junction. To correct for these characteristics of the output beam 54 the imaging apparatus 10 is provided with a collimating lens 58 which corrects the beam 54 from a divergent beam to a beam having parallel rays and a cylindrical lens system 60 which corrects the beam's 54 astigmatism and cause the beam 54 to become circular in cross-section.

After the cylindrical lens system 60, the beam 54 through a neutral density attenuator 62 which matches the output of the laser diode 12 to the characteristics of the photographic element 16. Since the lenses 58 and 60 and the attenuator 62 change the characteristics of the output beam 54, it may be advantageous to interpose the beam splitter 56 between one or all of these elements and the laser diode 12 so that the photoelectric cell 50 is struck by a beam 52 which is more representative of that actually emitted by the diode 12.

The beams 54, 54a and 54b emitted respectively from the laser diodes 12, 12a and 12b are combined by beam combiners 64 and 66 (which may be identical to the beam splitter 56) into the single beam 14 which is a resulting three-wavelength beam containing three preferably colinear but independent beams. Three spaced, adjacent beams may also be utilized, if desired.

These combined beams, herein referred to as a single beam 14, are then directed toward the facets of the rotating polygonal mirror 18 through a cylindrical lens system 67. Scanning, which is the continual sweeping of the radiation beam 14 across the surface of the photographic element 16, preferably is achieved by the high speed rotation of the polygonal mirror 18 which has one or more reflecting facets. A lesser number of reflective facets will either reduce the correctional demands placed on the motor controller 46 or the expense of providing highly uniform effective surfaces, while a greater number of facets will decrease the time interval between successively scanned beams and, therefore, decrease the length of time necessary to completely cover the surface of the photographic element 16. Although a rotating polygonal mirror is illustrated and preferred, a scanning galvonome!er, acousto-optic deflector or a holographic deflector, all of which devices are well known in the art, may be employed.

As the polygonal mirror 18 rotates in a clockwise direction from the perspective of FIG. 1, the scanned radiation beam 14 moves in a downward direction, with respect to FIG. 1, and is reflected by a planar mirror 68 to the photographic element 16. The mirror 68 is provided to fold the path of the radiation beam 14 and thus conserve space, but may be eliminated if space consideration is not a concern prior to contacting the mirror 68, the radiation beam 14 is first reflected to strike a start-of-scan photoelectric detector 70 along the radiation path 72 indicated by a phantom line. The detector 70 generates a timing signal which causes the driving circuit 38 to initiate modulation and thus information transmission to the radiation beam at the proper instant. Thus, at the beginning of each line, a correction for any timing various during scanning of the previous line is provided.

Between the rotating mirror 18 and the planar mirror 68 are located two lenses 74 and 76 which correct for problems associated with the use of the rotating mirror 18 and scanning of the radiation beam 14. Lens 74 is a cylindrical toroidal lens which, when combined with the cylindrical lens system 67, is utilized to correct for an known as pyramidal error introduced by variations in the angles of the planes of the facets of the mirror 18 with respect to the axis of rotation of the polygonal mirror 18. This pyramidal error is a common problem associated with rotating mirrors and the use of the cylindrical toroidal ens 74 is suggested by U.S. Pat. No. 3,750,189 to Fleischer. The lens 74 provides that the focus of the beam 14 and the point of minimum pyramidal error coincide at the same point on the surface of the photographic element 16.

The lens 76 is a so-called "F-$\theta$" lens and is used to maintain the velocity of the beam 14 across the mirror 68 and the surface of the photographic element 16 at a constant value. In common imaging lenses the location of the beam 14 (r) on an imaging plane at a given projection angle ($\theta$) is given by the relationship:

$$r = f \cdot \tan \theta$$

where f = the focal length of the imaging lens.
In such a system the projection angle of the radiation beam on the imaging lens linearly changes with time. Accordingly, the moving speed of the scanned beam on the imaging plane changes non-linearly. With an increase of projection angle, the velocity of the beam 14 increases. If the scanned beam 14 is considered a series of discrete spots, this non-linearity causes the spots to become more spaced apart at the ends of the scan line compared to the spacing of the spots at the center of the scan line. In order to avoid this result, the imaging lens 76 in the present invention is tailored so as to have the property:

$$r = f \cdot \theta$$

A lens with this property is called an f-$\theta$ lens and causes the velocity of the scanned beam 14 to be constant across the entire scan line.

The system thus far described provides for the sweeping or scanning of the radiation beam 14 in a direction parallel to one edge of the photographic element 16. Provisions must be made for movement of the scanned radiation beam 14 across the photographic element 16 in a direction perpendicular to its direction of scan. This could be accomplished by progressively tilting the planar mirror 68 in response to signals provided by the start-of-scan photoelectric detector 70 or can be accomplished by moving the photographic element 16 in the manner illustrated by FIG. 2.

Figure 2:
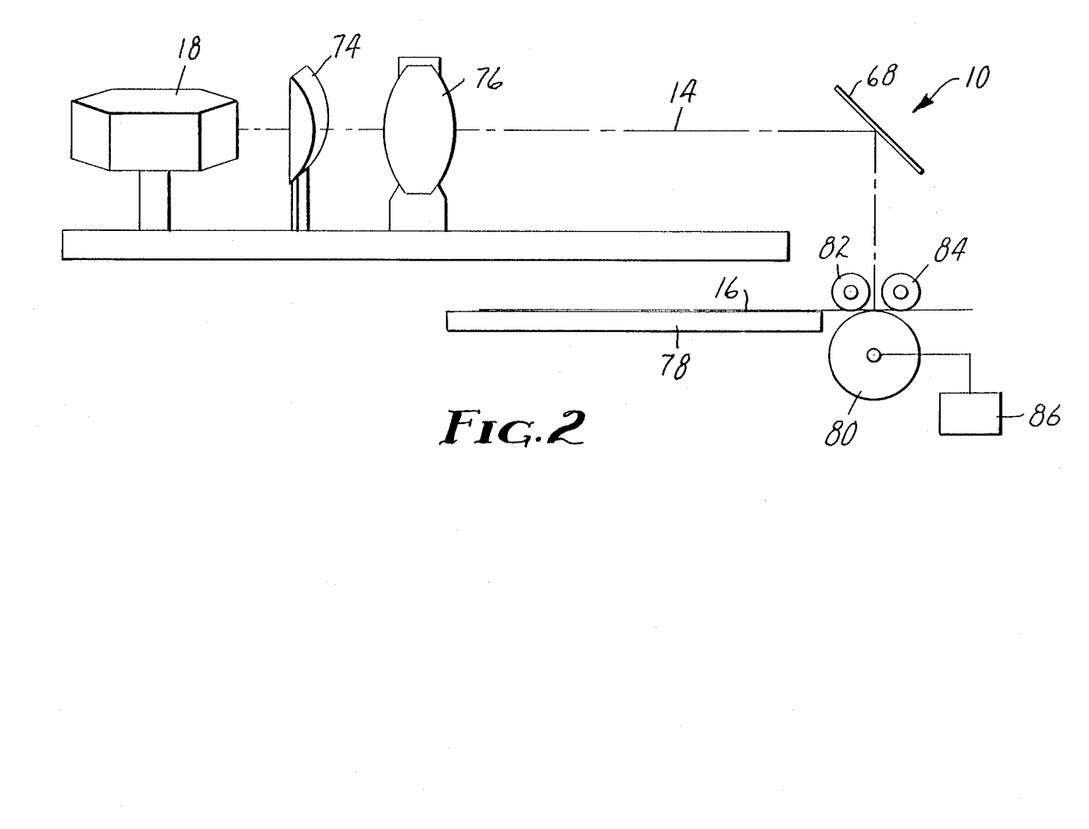
FIG. 2 is a schematic view of the laser diode imaging apparatus of FIG. 1 viewed generally from the perspective to line 2—2 of FIG. 1.

In FIG. 2, the photographic element 16 is supported by a table 78 and is engaged by a driven roller 80 and idler rollers 82 and 84. The driven roller 80 is controlled by a motor controller 86 which is responsive to a signal provided by the photoelectric detector 70 indicating that the scanning beam 14 is about to begin its sweep of the photographic element 16. Just prior to the scanning of the photographic element 16 by the beam 14, the motor controller 86 incrementally advances the photographic element 16 so that a new line of the photographic element 16 may be exposed. For simplicity, the photographic element 16 may be driven continuously, in which case the detector 70 operates only to ensure that the margin of the swept lines is even.

The roller system of FIG. 2 is one possible method of incrementally advancing the photographic element 16 but it should be recognized that many other systems are possible. For example, the photographic element 16 could be attached to a rotating drum, the table 78 could be advanced by a lead screw or the photographic element 16 could form a portion of a continuous sheet which is advanced relative to the scanning beam 14 by means of supply and take-up rolls located on each side of the scanning beam 14.

Figure 4:
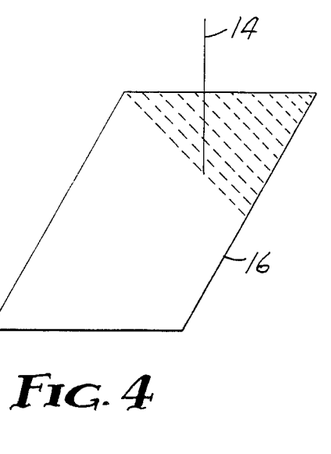
FIG. 4 is a schematic perspective view of an alternate scanning method which may be employed with the laser diode imaging apparatus of FIG. 1.

As shown in FIG. 4, the motion of the photographic element 16 relative to the scanned beam 14 need not be entirely perpendicular to the direction of scan of the beam 14. If the imaging apparatus 10 is arranged such that the scanning beam 14 scans the photographic element 16 in a direction which is not parallel to one of the edges of the element 16, the entire surface-of-the photographic element 16 may still be covered by advancing the element 16 in a direction parallel to one of its edges. All that is required, therefore, is that the direction of advancement of the photographic element contain a component direction which is perpendicular to the direction of scan of the scanning beam 14. The only direction of advancement of photographic element 16 which would not be effective is a direction which is entirely parallel to the direction of scan of the beam 14.

Figure 5:
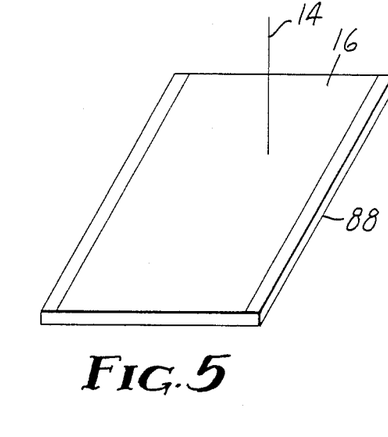
FIG. 5 is a schematic perspective view of a second alternate scanning method which may be employed with the laser diode imaging apparatus of FIG. 1.

FIG. 5 illustrates yet another method of scanning the radiation beam 14 across the entire surface of the photographic element 16. While the rotating polygonal mirror 18 is preferable because of the speed associated with its use, it is possible to insert the photographic element 16 in the path of the radiation beam 14 between the beam combiner 66 and the polygonal mirror 18 as these elements are illustrated in FIG. 1. In this instance the photographic element may be moved in direction both parallel and perpendicular to one of its edges in the manner described in U.S. Pat. No. 4,416,522 to Webster. In this event the polygonal mirror 18, cylindrical toroidal lens 74, f-$\theta$ lens 76 and planar mirror 68 may be eliminated and the appropriate focusing lenses modified to provide the correct focal point. As illustrated in U.S. Pat. No. 4,416,522, the photographic element 16 may be supported on a table 88 which is moved in perpendicular directions by appropriately controlled driving motors.

Operation

The laser diodes 12, 12a and 12b are selected to emit radiation within the infrared region of the electromagnetic spectrum at 780 nm, 830 nm and 880 nm, respectively. These particular values of the wavelength of radiation emitted by the diodes 12, 12a and 12b are not critical but are selected to provide maximum separation between the wavelengths of radiation emitted by each of the three laser diodes 12, 12a and 12b.

Maximum separation between the radiation emitted by the diodes 12, 12a and 12b is desirable because this maximum separation will simplify the construction of the photographic element 16 since the problem of spurious images between the photosensitive layers 22, 26 and 30 is reduced with greater wavelength separation. The problem of spurious imaging between the photosensitive layers 22, 26 and 30 of the photographic element 16 is discussed above in the section concerning the photographic element 16.

State of the art laser diodes emit radiation between wavelengths of approximately 750-900 nanometers. The selection of laser diodes 12, 12a and 12b emitting radiation at 780, 830 and 880 nm, therefore, represents the maximum practical spread of wavelengths which can be easily obtained from the range of wavelengths obtainable in commercial laser diodes. It is contemplated that if laser diodes which emit radiation in other wavelength regions of the electromagnetic spectrum become available that laser diodes will be selected which will have a greater wavelength separation than the 50 nm reflected herein.

In preparation for printing an image on the photographic element 16, the laser diodes 12, 12a and 12b are not receiving any analog input signal from the digital-to-analog converter 42 representing information to be imaged, but receive a small current from the feedback circuit, which includes the infrared photoelectric cell 50, which maintains the laser diodes 12, 12a and 12b at their threshold levels so that the laser diodes will not be turned off completely. The low intensity radiation beams emitted by the diodes 12, 12a and 12b are optically corrected and combined, as described above, into a colinear combined beam 14 which is directed to the rotating polygonal mirror 18. Rotation of the mirror 18 causes the reflection of the beam 14 to be swept in a downward direction, with reference to FIG. 1, until the beam 14 contacts the start-of-scan photoelectric detector 70.

The detector 70 provides a signal that the emitted beam 14 is about to begin its scan of the photographic element 16 and instructs the digital-to-analog converter to begin transferring information to the laser diode driving circuits 38, 38a and 38b after a suitable time delay which represents the time necessary for the beam 14 to travel from the photoelectric detector 70 to the photographic element 16 as the beam 14 is scanned or swept downwardly.

When the combined beam 14 strikes the photographic element 16, the laser diodes 12, 12a and 12b are continuously modulated by their respective digital-to-analog converters 42, 42a and 42b and driving circuits 38, 38a and 38b to regulate the intensity of the radiation emitted by the laser diodes 12, 12a and 12b in accordance with digital information supplied to the digital-to-analog converters 42, 42a and 42b.

The digital information supplied to each of the laser diodes 12, 12a and 12b usually corresponds to a different one of the three additive primary colors (blue, green and red) into which any full-color image may be divided. The digital information corresponding to the blue constituent of the image may then control laser diode 12 which emits radiation at a wavelength of 780 nm. Laser diode 2a, emitting radiation at 830 nm, may correspond to digital data representing the color green and the laser diode 12b, emitting radiation at 880 nm, may be supplied digital information corresponding to the color red. The assignment of particular wavelength to particular colors is purely arbitrary and any laser diode 12, 12a or 12b could be used to transmit information relating to any of the primary colors, or for that matter, any color.

Each of the three colinear beams from the laser diodes 12, 12a and 12b, which comprise the single beam 14, is modulated constantly and independently to vary its intensity in accordance with the intensity of its corresponding color in the image to be printed. The radiation emitted by the laser diodes 12, 12a and 12b may be modulated at a frequency up to the limits of the solid state components of the system, which may be many million samples per second. Typically, however, such a high sampling rate will not be used because the human eye cannot differentiate such fine detail. The image imparted to the photographic element 16 will more typically be a series of spots or pixels which will typically be gaussian or truncated gaussian in shape with a diameter of 85 micrometers. The spot diameter may be varied between approximately 5 and 1,000 micrometers, depending upon the optical system utilized. Also typically, 12 pixels per mm are used to produce the scan lines, although 1 to 200 pixels per mm may be utilized, depending upon the resolution desired.

By considering one individual pixel, it can be understood how any color may be produced on the photographic element 16 and how the density of this color may be varied. When the combined radiation beam 14 strikes a point on the surface of the photographic element 16, the radiation from the laser diodes 12, 12a and 12b penetrate to expose the three photosensitive layers 22, 26 and 30. Under the hypothetical situation stated above, radiation at 780 nm from diode 12 contains information corresponding to the proportion of the color blue in the original image and so the photosensitive layer 30 will contain dyes which produce this primary color when exposed and developed. Likewise, the intermediate layer 26 responds to the wavelength of 830 nm and produce the color green when exposed and developed. Finally, the lowest emulsion layer 22 is particularly sensitive to radiation at 880 nm and will produce the color red upon exposure and development. Any given exposed pixel will, therefore, contain the colors blue, green and red superimposed one on top of the other. When viewed together these three additive primary colors can produce any color of the visible region of the electromagnetic spectrum, within the color space defined by the particular colorants used, by varying the relative density of each of the primary colors. The density of each of the colors is controlled by modulating the intensity of the three colinear beams striking the photographic element 16. The relative exposure of each of the three photosensitive layers 22, 26 and 30 will thus determine the color perceived, and any color within the available color space of the spectrum may be achieved.

To vary the density of any color produced, the intensity of the three beams produced by the diodes 12, 12a and 12b are modulated in unison but the relative intensities of the three beams is preserved. Thus, the density of any color may be increased by increasing the radiation emitted by all of the laser diodes 12, 12a and 12b while the density of any color produced on the photographic element 16 may be decreased by simultaneously limiting the intensity of all of the radiation beams emitted by the diodes 12, 12a and 12b.

There has been described a laser diode imaging apparatus which can produce a broad and continuous range of colors of the visible region of the electromagnetic spectrum, and at varying densities. Thus, a full-color, continuous-tone image may be produced on a photographic element.

The foregoing laser diode apparatus has been described with respect to a system which employs three diodes and a photographic element having three corresponding photosensitve layers. This is the most convenient arrangement since this number of elements corresponds to the number of primary colors. Any number of diodes and photosensitve layers may be provided, however, so long as the number of diodes equals the number of photosensitve layers comprising the photographic element. For example, it may be advantageous to provide a fourth diode and emulsion layer dedicated to the color black. It is believed that a truer rendition of black portions of the original may thus be achieved than can be obtained by a combination of the primary colors. As another example, Edwin H. Land suggests in "The Retinex Theory of Color vision", *Scientific American*, pages 108-128 (December, 1977) and "Color Vision and the Natural Image", *Proceedings of the National Academy of Science*, pages 115-129 and 636-644 (volume 45, 1959) that only two colors (and, therefore, only two laser diodes) need be mixed to produce a broad and continuous range of colors.

Various modifications and alterations of this invention will be apparent to those skilled in the art and it is intended that this invention include all such modifications and alterations which fall within the scope and spirit of the appended claims.

We claim:

1. A laser diode imaging apparatus for producing multi-color, contionus tone images on a photographic element upon exposure to laser diode radiation, the photographic element including a substrate and three superposed photosensitive layers on one side of the substrate, each photosensitive layer being associated with a different photographic coupler capable of forming a different color dye upon said exposure and development by reaction with an oxidized photographic developer, each photosensitive layer being sensitized to a different wavelength of the electromagnetic spectrum, the imaging apparatus comprising:

three laser diodes, each emitting radiation at a particular wavelength of the electromagnetic spectrum which is different from that of any of the other laser diodes and which corresponds to said wavelength at which one of said photosensitive layers is sensitized and wherein one of said laser diodes emits radiation at a wavelength of 780 nm, one of said laser diodes emits radiation at a wavelength of 830 nm and one of said laser diodes emits radiation at a wavelength of 880 nm;

means for modulating continously the intensity of said radiation emitted by said laser diodes to correspondingly modulate said exposure of said photosensitive layers and thereby the density of said color upon development;

means for directing said radiation emitted by said laser diodes to said photographic element, focusing said radiation to a spot and traversely scanning said radiation spot across the surface of said photographic element; and means for advancing said photographic element relative to said scanned radiation in a direction having a component direction perpendicular to said direction of scanning so that all portions of said photosensitive layers are exposed to said radiation;

so that an image is produced by said exposure of said photosensitive layers to said laser diode radiation, so that said image is multi-colored in that any color within the color space defined by said color dyes may be produced and so that said color has a continuous tone in that the density of said color may be determined by modultion of all of said laser diodes and thereby said exposure of all of said photosensitive layers.

2. A laser diode imaging apparatus according to claim 1 further comprising means for combining said radiation emitted by said laser diodes into a colinear beam of radiation.

3. A laser diode imaging apparatus according to claim 2 wherein said means for combining said radiation is two cube beam splitters disposed between said laser diodes and said photographic element.

4. A laser diode imaging apparatus according to claim 1 wherein said means for directing, focusing and scanning said radiation comprises a rotating polygonal mirror having at least one reflective surface, a collimating lens and at least one cylindrical lens interposed in the path of radiation from each of said laser diodes to said polygonal mirror, and a toroidal lens and an F-$\theta$ lens interposed between said polygonal mirror and said photographic element.

5. A laser diode imaging apparatus according to claim 1 wherein said means for advancing said photographic element relative to said scanned radiation comprises a driven roller in engagement with said photographic element and a controller responsive to the position of said scanned beam for advancing said driven roller.

* * * * *